United States Patent [19]

Kato et al.

[11] Patent Number: 5,623,352
[45] Date of Patent: Apr. 22, 1997

[54] FERROELECTRIC LIQUID CRYSTAL SPATIAL LIGHT MODULATOR WITH TWO THRESHOLD CHARACTERISTICS

[75] Inventors: Naoki Kato; Teruo Ebihara; Rieko Sekura; Shuhei Yamamoto, all of Tokyo, Japan

[73] Assignee: Seiko Instruments Inc., Japan

[21] Appl. No.: 93,351

[22] Filed: Jul. 16, 1993

[51] Int. Cl.6 .............................. G02F 1/135; G02F 3/00
[52] U.S. Cl. .............................. 349/17; 359/108; 349/27
[58] Field of Search .............................. 359/100, 72, 56, 359/256, 246, 294, 107, 108; 345/97, 95

[56] References Cited

U.S. PATENT DOCUMENTS 5,130,830  7/1992  Fukushima et al. ................ 359/71
5,132,811  7/1992  Iwaki et al. ....................... 359/72
5,191,408  3/1993  Takanashi et al. ................. 359/72
5,420,709  5/1995  Kato et al. ....................... 359/72

FOREIGN PATENT DOCUMENTS 0475249   3/1992   European Pat. Off. .
0510540   10/1992  European Pat. Off. .
0525424   2/1993   European Pat. Off. .

Primary Examiner—William L. Sikes
Assistant Examiner—Tai V. Duong
Attorney, Agent, or Firm—Adams & Wilks

[57] ABSTRACT

By using a ferroelectric liquid crystal light valve having a hydrogenated amorphous silicon photoconductive layer, a spatial light modulator may be driven by a method comprising the sequential application of successive pulse voltages of selective amplitude, polarity and duration to cause the spatial light modulator to manifest a second threshold level suitable for application of the device in Boolean processing applications and Fourier image processing.

22 Claims, 5 Drawing Sheets

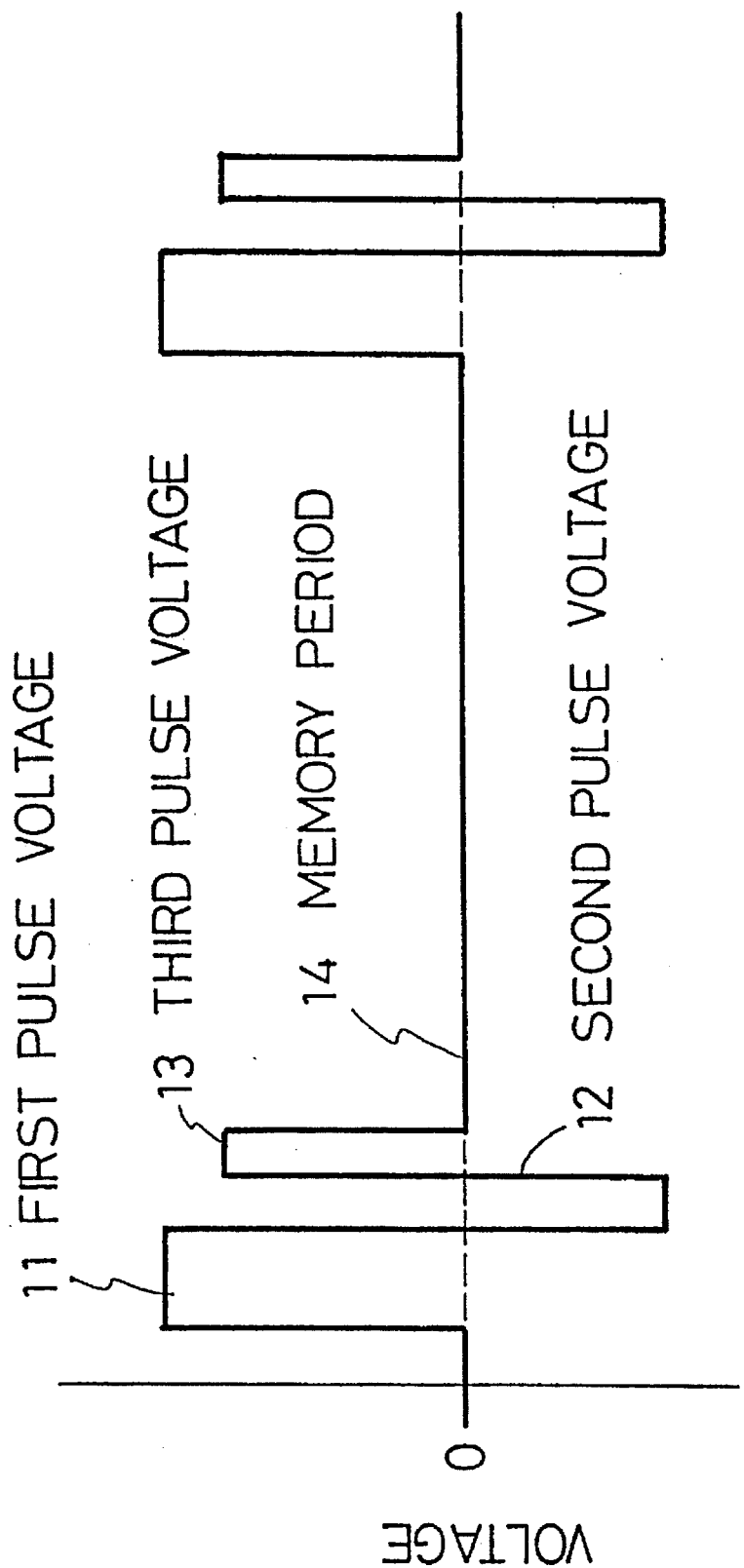

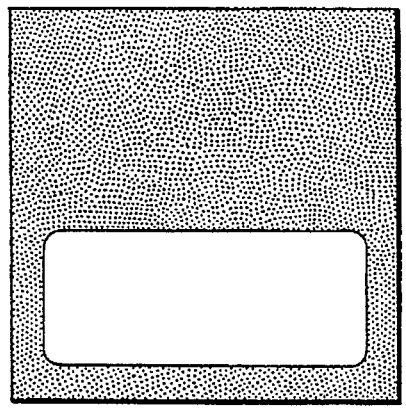
FIG. 2-a
INPUT 1
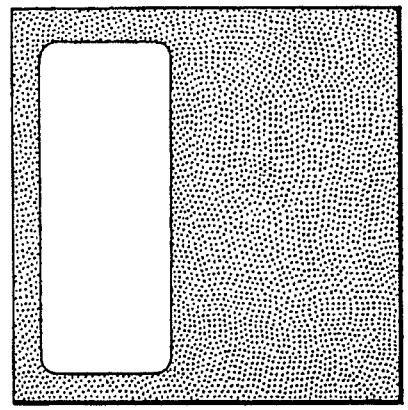
FIG. 2-b
INPUT 2
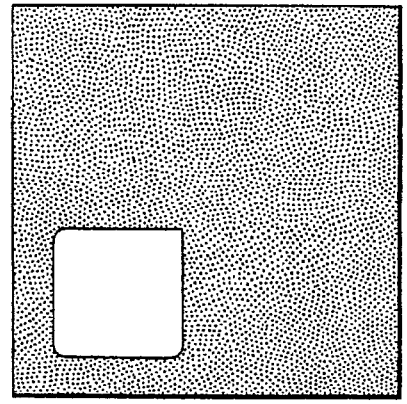
FIG. 2-c
AND OUTPUT
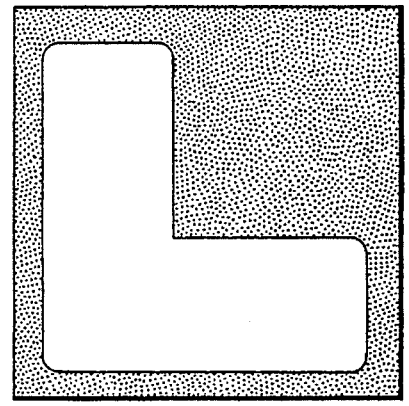
FIG. 2-d
OR OUTPUT
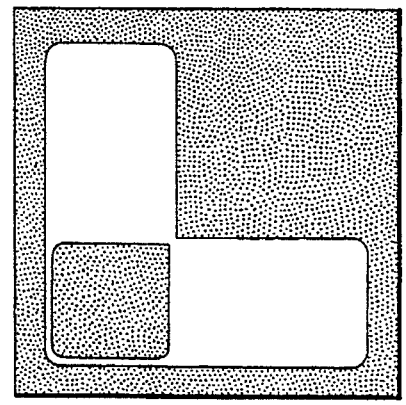
FIG. 2-e
XOR OUTPUT

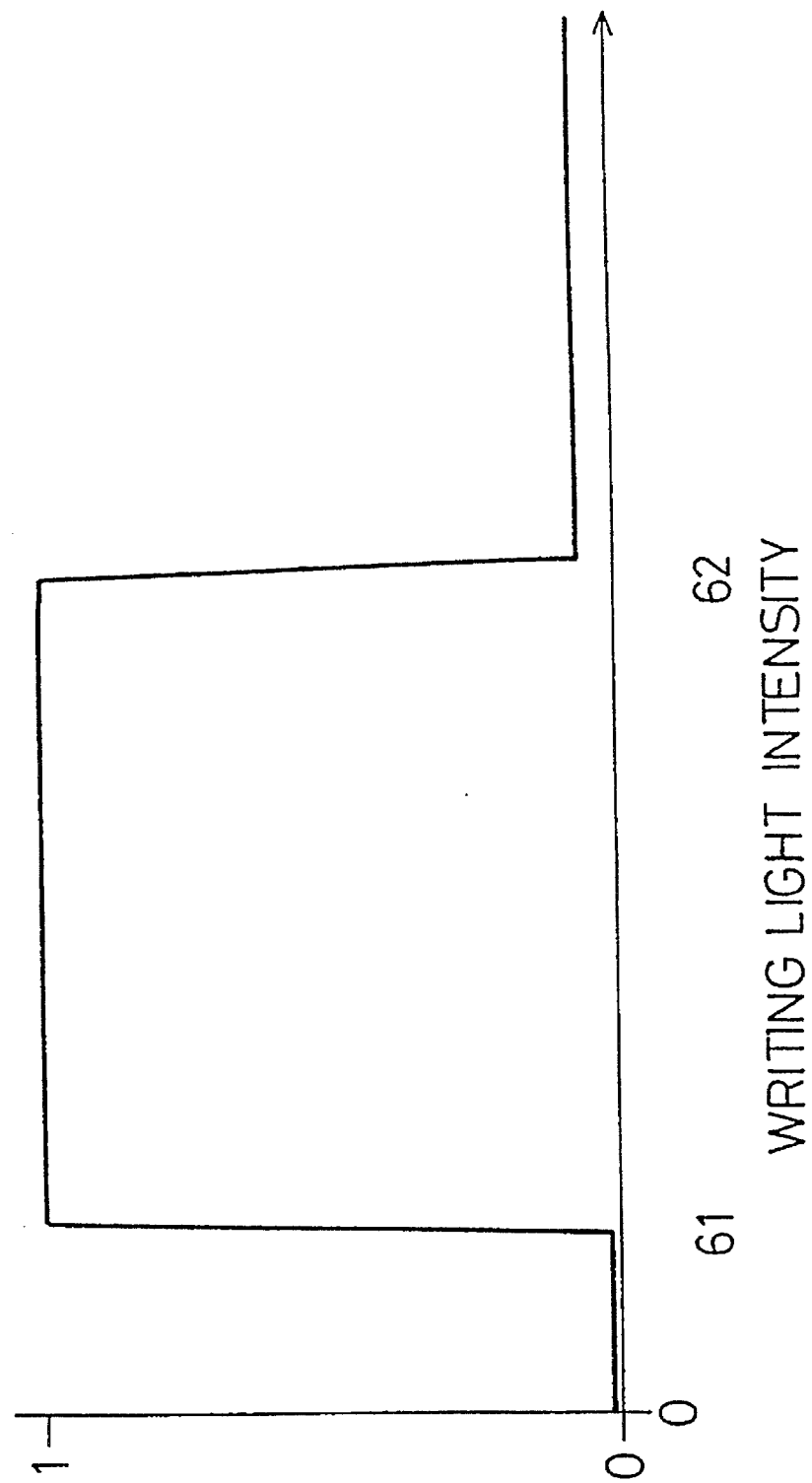

FERROELECTRIC LIQUID CRYSTAL SPATIAL LIGHT MODULATOR WITH TWO THRESHOLD CHARACTERISTICS

BACKGROUND OF THE INVENTION

The present invention relates to an optically writeable spatial light modulator of the ferroelectric liquid crystal type and also relates to a driving method thereof, which device and driving method may be utilized in an image processing device, an optical information processing device, or a related device.

Conventionally, a spatial light modulator of the ferroelectric liquid crystal type is utilized as an optical device for modulating the intensity of image information input thereto on a real time basis to output a modulated result. Further, in Japanese Patent Application No. 239594/1990, the inventors have disclosed a method for driving the above noted optical modulator to produce an output image having a continuous gradation.

For a conventional spatial light modulator of the ferroelectric liquid crystal type and its conventional driving methods, there is only one threshold value per writing light intensity level. For example, when there is digital logic using one output light (reading light) in response to two input lights (writing lights), although AND or OR logic functions could be obtained by setting the input light intensity to the threshold value, XOR or XNOR logic function can not be obtained. Also, the connection of several devices in a cascade and synchronizing of the devices is required. This has prevented the conventional spatial light modulator and its conventional driving methods from being applied in optical computing and related areas. Also, according to analog Fourier optical information processing system, because of zeroth order light processing and the dynamic range, the conventional spatial light modulator and its driving methods could not be utilized for the higher-order region.

SUMMARY OF THE INVENTION

Therefore, in order to solve the above noted problem in the prior art, the object of the present invention is, in the driving of a spatial light modulator using a ferroelectric liquid crystal, to enable the manifestation of a second threshold value which enables the performance of a useful function for optical information processing without using a special device structure. In accordance with the present invention, the application field to which spatial light modulators may be used rapidly increases to both digital and analog systems.

In order to solve the above noted problem, the driving method of the present invention is applied to a spatial light modulator of the ferroelectric liquid crystal type having optical writing means, optical reading means, voltage applying means, and a light valve comprised of a first glass substrate on which is formed successively thereon a transparent electrode, a photoconductive film and a liquid crystal alignment film, a second glass substrate on which is formed thereon a transparent electrode and a liquid crystal alignment film and being opposed to said one glass substrate, and a ferroelectric liquid crystal film contained between the pair of glass substrates wherein the photoconductive film is composed of intrinsic hydrogenated amorphous silicon having a thickness from 0.5 to 4 µm and the ferroelectric liquid crystal layer has a thickness from 0.5 to 5 µm and is driven with a continuously emitted reading light. The driving method of the present invention enables the manifestation of a second threshold value, at which the ferroelectric liquid crystal molecules in the region receiving stronger writing light are transferred back to the previous stable state in the region having a stronger writing light than the first threshold value of the writing light intensity where the ferroelectric liquid crystal molecules transfer from one stable state to the other stable state when the writing light is not emitted, and also enables the controlling of the first and second threshold values by varying driving pulse width, driving pulse voltage, or by using an emitted bias light. In accordance with the inventive driving method, writing is accomplished with driving pulses which consist of the first pulse voltage which makes causes the ferroelectric liquid crystal molecules to take on one stable state that is stabilized when the writing light is not emitted to the entire effective surface of the spatial light modulator, a second pulse voltage having the opposite polarity from that of the first pulse, which transfers the ferroelectric liquid crystal molecules from the first stable state to the second stable state. A third pulse voltage having the same polarity as that of the first pulse, which transfers the ferroelectric liquid crystal molecules from the second stable state to the first stable state when a writing stronger than the second threshold value light is emitted, and a memory period during which the ferroelectric liquid crystal molecules are kept in the same state after application of the third pulse voltage.

By using the method described above, two threshold values of writing light intensity will be obtained, and will be easily controllable. By such operation, in digital optical information processing, the entire set of Boolean logic operations having binary output values and binary inputs can be realized using only one element. Also, in an analog system, the erasing of zeroth order light and the like can be easily realized. By such operation, applications of a spatial light modulator of the ferroelectric liquid crystal type can be rapidly expanded to either digital systems or analog systems.

BRIEF DESCRIPTION OF THE DRAWINGS

FIG. 1 shows a waveform used to drive the inventive spatial light modulator of the ferroelectric liquid crystal type.

FIGS. 2a–2e show photographs of output AND, OR, and XOR combinations of images using images on both masks of an optical writing system using the driving method of the spatial light modulator according to the present invention.

FIG. 5 is a graph showing the reading light intensity in the case of reading in a continuous drive status, by changing the writing light intensity and emitting the reading light using the inventive driving method for the spatial light modulator.

DETAILED DESCRIPTION OF THE PREFERRED EMBODIMENTS

Hereinafter, the present invention will be described in detail with reference to the attached drawings.

Embodiment 1

Figure 3:
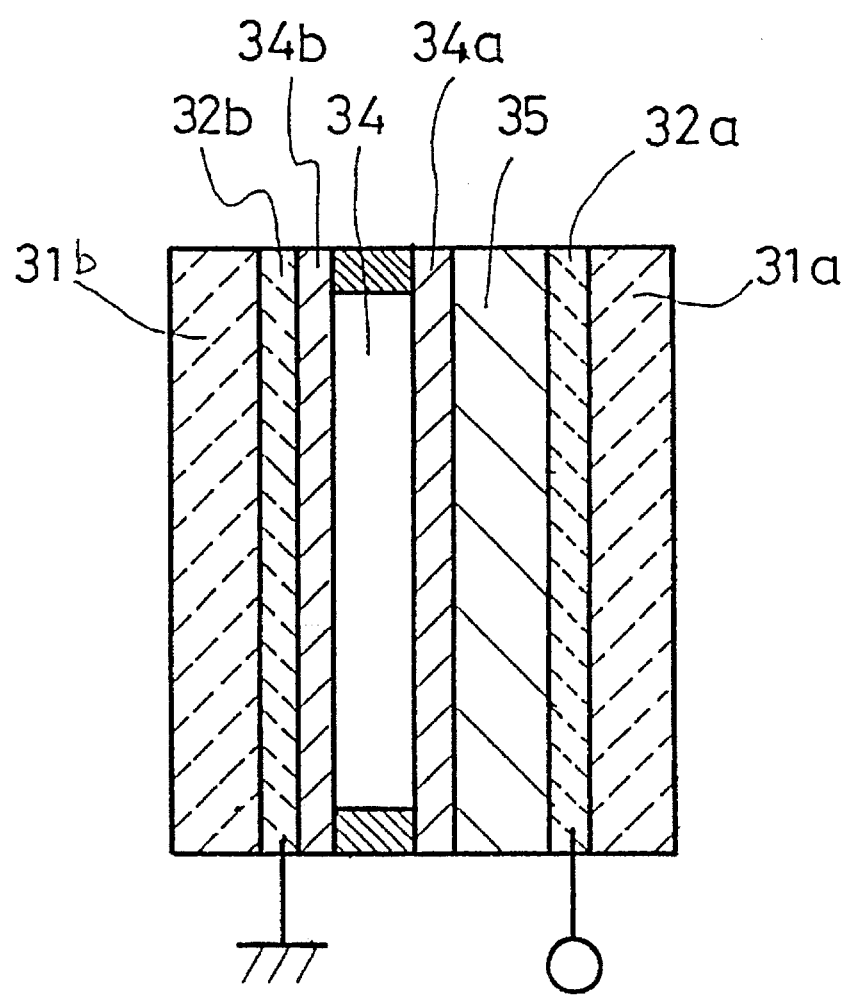
FIG. 3 is a schematic diagram showing the structure of the inventive optically writeable liquid crystal spatial light modulator of the ferroelectric liquid crystal type.

FIG. 3 is a schematic diagram showing the structure of an optically writeable-mode spatial light modulator of the ferroelectric liquid crystal type according to the present invention.

Liquid crystal molecules are sandwiched between a pair of substrates 31a and 31b which are comprised of a transparent glass plate having a thickness of 5 mm and being polished on both faces to ensure a parallel flatness of less than $\lambda/5$ where $\lambda$ denotes the wavelength of a He-Ne laser beam. ITO transparent electrode layers 32a and 32b are formed on one surface of each of the respective substrates 31a, 31b. The transparent electrode layer 32a is dispersed at the optical writing side, and is formed thereon with a photoconductive layer 35 having a thickness of 2.5 μm and is composed of hydrogenated amorphous silicon (a-Si: H). Further, alignment film layers 34a and 34b are formed on the respective substrates such that silicon monoxide is obliquely evaporated at an incident angle of 85° relative to the normal to the substrates, and such that respective incident angles are coincident with each other on the writing and reading sides after the pair of substrates are coupled to one another.

Next, the pair of substrates are fixed to each other through a peripheral sealer which is applied using an offset printing method. The sealer contains therein dispersed silica particles having a mean diameter of 1.0 μm. A gap is thus formed between the substrates in which is sandwiched a ferroelectric liquid crystal 34.

The ferroelectric liquid crystal composition 34 is composed of, for example, SCE-13 (made by BDH). The composition is heated over the isotropic phase point. Thereafter, the composition is injected into the gap under vacuum, and is then gradually cooled to a smectic C phase to establish a uniform alignment of the liquid crystal molecules.

FIG. 1 is a diagram showing the waveform used to drive the spatial light modulator of the ferroelectric liquid crystal type according to the present invention. The waveform is composed of a series of consecutively occurring pulses, including the first pulse voltage 11 which ensures that the whole effective area is erased, the second pulse voltage 12 having the opposite polarity from that of the first pulse voltage, the third pulse voltage 13 having the same polarity as the first pulse voltage, and the memory period 14, and the pulse width and the voltage of the second and third pulse voltages are controlled separately.

Figure 4:
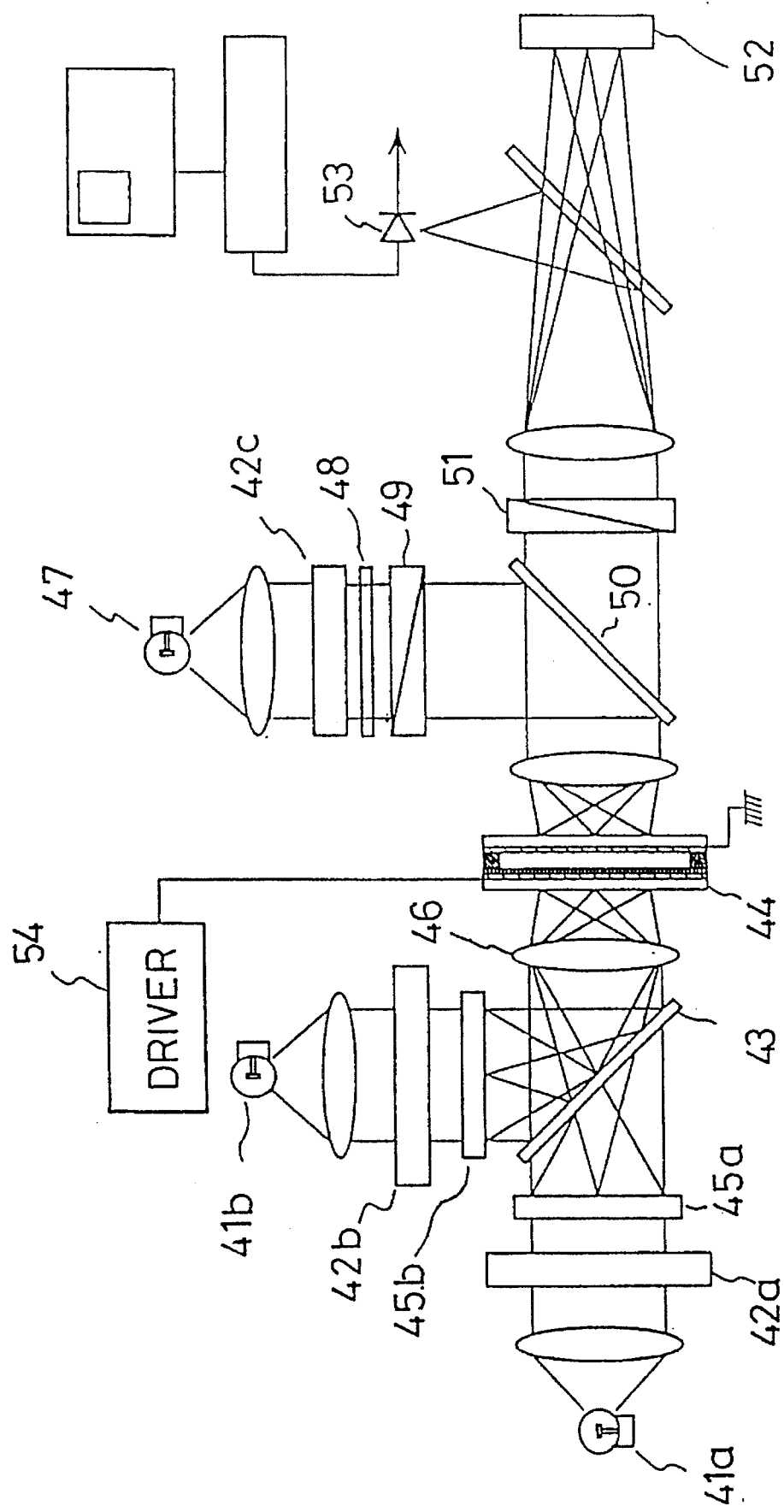
FIG. 4 is a system diagram of the optical system used for read and write operations.

FIG. 4 is a system diagram of an optical system used for an experiment concerning read and write operations. This experiment was previously disclosed by applicants in Kato et al., Threshold Characteristics of an OASLM using a a-Si:H Photoconductor and a SSFLC modulator, (Photonics for Computers, Neural Networks, and Memories, proceedings of the International Society Jul. 22–24, 1992), which is incorporated herein by reference. Waveform distribution is controlled through interference filters 42a and 42b using a tungsten halogen lamp as writing light sources 41a and 41b. The writing light is combined at the half-silvered mirror 43 and is emitted to the inventive spatial light modulator of the ferroelectric liquid crystal type 44.

To write an image, masks 45a and 45b as shown in the figure are mounted, and an image is projected on the input surface of the spatial light modulator 44 through the lens 46. A tungsten halogen lamp is used as the reading light source 47, and the light is emitted to the output surface of the inventive spatial light modulator of the ferroelectric liquid crystal type 44 through the interference filter 42c to control the waveform distributions, diaphragm 48 to adjust the quantity of light, polarizer 49, and beam splitter 50, and the light is reflected at the interface between the ferroelectric liquid crystal layer and the hydrogenated amorphous silicon, being modulated in the ferroelectric liquid crystal layer, and incident onto the beam splitter 50 again.

In the above described embodiment, the light which passes through the beam splitter 50 is detected by the analyzer 51, and is observed by CCD camera 52. The polarizer 49 is mounted in a direction where the plane of polarization is not modulated when the ferroelectric liquid crystal layer is in a stable state when the writing light is not emitted, the analyzer 51 is mounted normal to and in the path of the reflecting light in the above described condition. That is, in the status without a writing light, reading is in the dark status. For observation, an image is taken from CCD camera and is displayed on the CRT 51 and a photograph is taken. Also, the photodetector 53 is installed and optical response is measured. Driving is executed by the specially made driver 54.

A tungsten halogen lamp, a He-Ne laser, an Ar laser, or a semiconductor laser can be used as the light source for the writing light, and a tungsten halogen lamp, a He-Ne laser, an Ar laser, or a semiconductor laser can be used as the light source for the reading light.

Using the above described system, the following writing experiment is executed.

FIG. 5 is a diagram which shows the writing light intensity in a continuous driving status and using only one of the writing light sources, continuously emitting the reading light (100μ W/cm$^2$) and changing the writing light intensity in the optical system shown in FIG. 4.

With the increase in the writing light intensity, the change of the first threshold value 61 from dark status to light status and the change of the second threshold value 62 from light status to dark status are obtained. But, in the above described embodiment, the bias light is not emitted, and in the driving waveform, the erase pulse is +15 V and 1 ms, the write pulse is −10 V and 0.5 ms, the third pulse is +9.5 V and 0.5 ms, and the frame frequency is 100 Hz. The first threshold value occurs near a writing light intensity of 228μ W/cm$^2$ and the second threshold value occurs near a writing light intensity of 768μ W/cm$^2$.

Therefore, the manifestation of the first and second threshold values are demonstrated clearly.

Embodiment 2

FIG. 2 shows, in the optical system shown in FIG. 4, using both masks of the writing optical system 45a and 45b, using the shapes shown in FIG. 2-a and FIG. 2-b, and outputting AND, OR, and XOR combinations. As the reading light, 100μ W/cm$^2$ light is emitted continuously, using the same driving waveform, changing only the quantity of writing light, and is read in a continuous driving status.

FIG. 2-c shows AND, FIG. 2-d shows OR, and FIG. 2-e shows XOR. In the case of FIG. 2-c (AND), the writing light intensity of input 1 is 86μ W/cm$^2$ and the intensity of input 2 is 214μ W/cm$^2$. In the case of FIG. 2-d (OR), the writing light intensity of input 1 is 0.304μ W/cm$^2$ and the intensity of input 2 is 0.086μ W/cm$^2$. In the case of Fig, 2-e (XOR), the writing light intensity of input 1 is 618μ W/cm$^2$ and the intensity of input 2 is 660μ W/cm$^2$.

From the above, using the method of the present invention, by using only one spatial light modulator of the ferroelectric liquid crystal type, the different operations, AND, OR, and XOR, can be executed simultaneously on the same plane.

As described above, according to the driving method of the invention, the optically writeable liquid crystal spatial light modulator utilizing a ferroelectric liquid crystal enables the manifestations of the second threshold value to enable the appearance of a useful function for optical information processing without using a special device structure, thereby effectively expanding applications for either digital system or analog systems.

What is claimed is:

1. A method for driving a spatial light modulator comprising: projecting a light onto a writing surface of a spatial light modulator and applying thereto a waveform having a series of consecutive pulse voltages, including a first pulse voltage for erasing an optical modulation layer of the spatial light modulator, a second pulse voltage having an opposite polarity to the first pulse voltage, and a third pulse voltage having the same polarity as the first pulse voltage; wherein the intensity of the projected light is greater than a first threshold value during application of the second pulse voltage and is greater than a second threshold value which is greater than the first threshold value during application of the third pulse voltage, and wherein the first threshold value and the second threshold value of the light intensity are set according to the voltage level of the second and the third pulse voltages.

2. A method for driving a spatial light modulator according to claim 1; wherein the first threshold value and the second threshold value of the light intensity are set according to the time width of the second and third pulse voltages.

3. A method for driving a spatial light modulator according to claim 2; wherein the light is not projected during a reading period of the spatial light modulator.

4. A driving method for a spatial light modulator having optical writing means, voltage applying means, optical reading means having a light illuminating means and a photodetecting means, and a light valve comprised of a first transparent substrate having thereon a transparent electrode layer and a photoconductive layer, a second transparent substrate having thereon a transparent electrode layer and being opposed to said first transparent substrate, and a ferroelectric liquid crystal layer interposed between the transparent substrates, the driving method comprising the steps of applying a first pulse voltage to the light valve to cause the molecular alignment of the ferroelectric liquid crystal layer to move to a first stable state; transferring the molecular alignment from the first stable state to a second stable state by emitting light having an intensity stronger than a first threshold value onto a writing surface of the light valve while applying a second pulse voltage having an opposite polarity from that of the first pulse voltage to the light valve; transferring at least a part of the molecular alignment from the second stable state to the first stable state by emitting light onto the writing surface of the light valve having an intensity stronger than a second threshold value larger than the first threshold value while applying a third pulse voltage having the same polarity as the first pulse voltage to the light valve; and maintaining both the first stable state and the second stable state of the molecular alignment after applying the third pulse voltage during a reading period thereof.

5. A driving method for a spatial light modulator according to claim 4; wherein the first threshold value and the second threshold value of the emitted light intensity are set according to the voltage level of the second and the third pulse voltages.

6. A driving method for a spatial light modulator according to claim 4; wherein the first threshold value and the second threshold value of the light intensity are set according to the time width of the second and the third pulse voltages.

7. A driving method for a spatial light modulator according to claim 4; wherein the first and second threshold values are controlled by controlling the intensity of a light which is emitted from a light source being set at one of the writing side and a reading side of the light valve.

8. A driving method for a spatial light modulator according to claim 4; wherein the writing light is not emitted during the reading period.

9. A driving method for a spatial light modulator according to claim 4; wherein the optical writing means comprises plural light emitting systems that control the intensity of the light emitted onto the writing surface independently such that plural images may be emitted simultaneously onto the writing surface of the light valve.

10. A method for driving a spatial light modulator comprising the steps of: projecting light from at least one light source onto a writing surface of a spatial light modulator; simultaneously applying a series of consecutive pulse voltages to the spatial light modulator; wherein a first pulse voltage is applied to the spatial light modulator to erase the spatial light modulator by causing an optical modulating layer thereof to take on a first stable optical alignment, a second pulse voltage having a polarity opposite to that of the first pulse voltage is applied to the spatial light modulator while projecting the writing surface thereof with a light having an intensity greater than a first threshold value required to cause the optical alignment of at least a portion of the optical modulating layer to take on a second optical alignment, a third pulse voltage having the same polarity as the first pulse voltage is applied to the spatial light modulator while projecting the writing surface thereof with a light having an intensity greater than a second threshold value larger than the first threshold value to cause at least a portion of the optical modulating layer of the spatial light modulator to change from the second optical alignment to the first optical alignment, and wherein the optical state of the optical modulating layer is maintained for a predetermined time to allow reading of the light valve from a reading surface thereof.

11. A method for driving a spatial light modulatator, according to claim 10; wherein the spatial light modulator of the ferroelectric liquid crystal type.

12. A method for driving a spatial light modulator according to claim 10; wherein the spatial light modulator comprises a first transparent substrate comprising a transparent insulating layer having a transparent electrode layer, a photoconductive layer and an alignment layer successively formed thereon, a second substrate opposing the first substrate and comprising a transparent insulating layer having a transparent electrode and an alignment layer successively formed thereon, a peripheral seal layer sealing the first and second substrates together with a predetermined gap therebetween, and a ferroelectric liquid crystal layer disposed in the gap.

13. A method for driving a spatial light modulator according to claim 12; wherein the insulating substrates have a thickness of 5 mm.

14. A method for driving a spatial light modulator according to claim 12; wherein the insulating substrates hat a parallel flatness of less than one-half the wavelength of a Helium-Neon laser beam.

15. A method for driving a spatial light modulate according to claim 12; wherein the transparent electrodes formed of ITO.

16. A method for driving a spatial light modulator according to claim 12; wherein the photoconductive layer is formed of hydrogenated amorphous silicon.

17. A method for driving a spatial light modulator according to claim 12; wherein the alignment layers are formed of silicon monoxide deposited at incident angles of 85° relative to normals of the first and second transparent substrates.

18. A method for driving a spatial light modulator according to claim 12; wherein the alignment layers are formed such that respective incident angles are coincident on writing and reading sides of the spatial light modulator.

19. A method for driving a spatial light modulator according to claim 12; wherein the peripheral seal layer is disposed about the periphery of the first and second transparent substrates.

20. A method for driving a spatial light modulator according to claim 12; wherein the peripheral seal layer includes particles dispersed throughout to form the predetermined gap between the first and second substrates.

21. A method for driving a spatial light modulator according to claim 12; wherein the ferroelectric liquid crystal material comprises SCE-13.

22. A method for driving a spatial light modulator according to claim 12; wherein the ferroelectric liquid crystal layer is formed by heating a ferroelectric liquid crystal composition over the isothermic phase point thereof, injecting the composition into the gap formed between the first and second substrates, and cooling the ferroelectric liquid crystal composition to a smectic C phase.

* * * * *